United States Patent

Friedman et al.

[15] 3,647,532
[45] Mar. 7, 1972

[54] APPLICATION OF CONDUCTIVE INKS

[72] Inventors: Arnold I. Friedman, South Euclid; Ralph L. Bartholomew, Painesville, both of Ohio

[73] Assignee: General Electric Company

[22] Filed: Feb. 17, 1969

[21] Appl. No.: 799,979

[52] U.S. Cl. ........................ 117/212, 252/512, 252/513
[51] Int. Cl. ........................................................ H01b 1/02
[58] Field of Search .................. 252/512, 513, 514; 117/212

[56] References Cited

UNITED STATES PATENTS

| | | | |
|---|---|---|---|
| 3,239,373 | 3/1966 | Hoodwin | 117/38 X |
| 3,080,328 | 3/1963 | Billian | 252/513 |
| 3,056,881 | 10/1962 | Schwarz | 117/93.3 X |
| 2,993,815 | 7/1961 | Treptow | 252/512 X |
| 2,855,491 | 10/1958 | Navias | 252/513 X |
| 2,717,946 | 9/1955 | Peck | 252/514 X |

Primary Examiner—Alfred L. Leavitt
Assistant Examiner—Alan Grimaldi
Attorney—John F. McDevitt, Henry R. Truesdell, Frank L. Neuhauser, Oscar B. Waddell and Joseph B. Forman

[57] ABSTRACT

Conducting inks comprising metalic powders such as copper suspended with glass frits in fugitive or temporary organic binders, preferably with reducing compounds, can be used to make printed conductors by firing a refractory substrate coated with the ink in an atmosphere which is essentially neutral except that it contains sufficient oxygen to burn out the temporary binder, but with the oxygen at a low enough partial pressure that it will not cause any substantial oxidation of the metal particles.

7 Claims, No Drawings

APPLICATION OF CONDUCTIVE INKS

BACKGROUND OF THE INVENTION

This invention relates to conductive inks and processes for coating and firing such inks on refractory substrates. More particularly, it relates to such inks containing metal powders and glass frit suspended in a temporary or fugitive organic binder.

In the prior art, conductive inks mainly relied upon silver or other noble metals with the selected metal powders being thoroughly mixed with a vitreous glass frit. The high cost of using these metals was often thought unavoidable due to the necessity of avoiding oxidation of the metal powder particles.

In previous attempts to use copper inks, it was generally thought desirable to assure oxidation of the surfaces of the copper metal particles to improve bonding between the copper particles, the glass frit, and the refractory substrate. However, this oxidation more or less degrades the conductivity of the ink.

SUMMARY OF THE INVENTION

It is an object of the present invention to provide processes for producing inexpensive conductive ink coatings or patterns on refractory substrates wherein the conducting phase is composed of powdered metallic particles without substantial oxidation on the metal particles, thus permitting a higher conductivity in the ink than otherwise.

Briefly stated, the present invention in certain of its embodiments provides a method of forming a conductive metal layer on a refractory substrate which comprises the following steps: applying to said refractory substrate a mixture of from 5 to 40 parts by weight of metallic powder, and one part by weight of a reduction-resistant glass frit, said mixture being suspended in a fugitive organic suspending medium, and firing said substrate in an otherwise neutral atmosphere containing from a small but effective amount to burn away said suspending medium up to about $1 \times 10^{-4}$ atmospheres partial pressure of oxygen until said glass frit is at least partially sintered and said suspending medium is burned away leaving substantially no residue. Metal powders of copper, nickel or cobalt or alloys based on one or more of them can be used.

In one preferred form, the selected metal is copper, and a mixture of from 10 to 40 parts by weight of copper powder to 1 part glass frit is used with an oxygen partial pressure no more than $10^{-4}$ atmospheres. Best results have been obtained when the atmosphere, aside from the specified critical oxygen content, is essentially all nitrogen, and when a reducing agent such as hydrazine hydrate is added to the ink composition to enhance the avoidance of substantial oxidation of the metal particle surfaces during the initial firing procedure.

A preferred glass for use with the invention has approximately the following composition in percent by weight:

| Composition | Percent |
| --- | --- |
| PbO | 66.4 |
| SiO$_2$ | 17.6 |
| B$_2$O$_3$ | 9.9 |
| CdO | 6.1 |

DESCRIPTION OF THE PREFERRED EMBODIMENTS

The deposition of electronic components by means of a silk-screening process is becoming of ever increased importance in manufacture of electronic devices. This silk-screening technique, the so-called "thick film" process as differentiated from "thin film" evaporative technique, is finding particular application in electronic miniaturization and the manufacture of hybrid circuitry wherein connections must be made from small electrical components to ultraminiaturized components. It is possible to apply conductors, resistors and capacitors by means of the thick film technique.

Thick film technology involves the deposition of an ink by standard silk-screening techniques upon a suitable nonconductive substrate, drying and firing the object to yield the electronic component. The substrate in general use is sintered alumina, although forsterite, beryllium oxide and other ceramic or vitreous materials can be used. The ink is composed of (1) a fugitive binder which imparts viscosity and desirable flow properties to the mix, (2) a glass frit which will bind the component to the substrate after the firing, and (3) the active component which will be a highly conductive material. Solvents and reducing agents can also be used.

In the present invention, using copper metal powder for purposes of illustration and as equivalent to the other claimed metals, advantage is taken of the ability to use low partial pressures of oxygen at elevated temperatures to burn off the fugitive binder but still prevent the oxidation of the copper to a nonconductive oxide. Also, the formation of substantial amounts of oxides from the metal surface of the copper particles which could significantly lower the conductivity of the ink is prevented.

The decomposable fluid suspending medium which would generally be a fugitive organic binder should supply the required flow properties to the mix and act as a binder for the ink printed on refractory substrates prior to firing. During firing the binder should decompose or burn away at moderate firing temperatures, preferably below 500° C. There are many materials known in the art which could be used as suitable fugitive organic binders, including acrylics and ethylcellulose. Ethyl hydroxyethyl cellulose seems to best combine the desired properties. A suitable solvent is used to dissolve this binder, and it contributes to flowability and printability of the ink also. Butyl carbitol acetate has performed satisfactorily as the solvent and has a desirable evaporation rate.

As an example, the binder can be prepared by dissolving low-viscosity grade ethyl hydroxyethyl cellulose, produced by Hercules, Inc., in butyl carbitol acetate with a high shear mixer to yield a 25 percent by weight mix of binder in solvent.

The choice of frit is dictated by the desired firing temperature and the type of substrate on which the ink will be applied. The frit should approximately match the substrate in coefficient of expansion, and should form an adherent bond to the substrate material. Because the frit is nonconductive, it should be used in the lowest concentrations possible, generally below 6 percent by weight relative to the weight of the metal content of the ink. Direct contact between metal powder particles is needed for good conductivity, and too much glass or heating at such a high temperature that the glass viscosity is lowered to the point where it can wet all of the metal surfaces can greatly lessen conductivity. The frit is preferably milled and sifted through a 400-mesh-to-the-inch screen (holes 37 microns square) prior to use. The following commercial frits have been found satisfactory for use on alumina:

| | | Type |
| --- | --- | --- |
| 1. | Harshaw Chemical Company Frit L-2900-26-0 | Lead borosilicate glass |
| 2. | Harshaw Chemical Company Frit Q-12 | Lead borosilicate glass |
| 3. | Ferro Corporation Frit XT-1021 | Alkaline borosilicate with a high titania content |
| 4. | Harshaw Chemical Company Frit L-2900-29-N | Lead borosilicate |
| 5. | Ferro Corporation Frit 208 | Alkaline borosilicate with zinc, free of titania |

Commercially available metallic powders of copper, nickel or cobalt can be used. If the metal powder, particularly copper powder, is too contaminated with oxide of the metal to be used directly, it can be fired at a moderate temperature in a reducing atmosphere such as hydrogen to convert it to essentially pure metal. The metal powder is then also sifted through a 400-mesh-to-the-inch screen.

The ability to fire a metal powder-containing ink at high temperatures is dependent on maintaining a low oxygen partial pressure in the firing atmosphere. Otherwise, excessive oxidation of the metal powder may substantially lower conductivity. At a firing temperature of 850° C., for firing a copper ink for example, we find a practical upper limit to be an oxygen partial pressure of $1 \times 10^{-4}$ atmospheres. The lower limit is a sufficient supply of oxygen to react with the fugitive organic binder and cause it to burn away by oxidation, decomposition, or volatilization in any other manner. Thus, in a practical situation, the desired rate of flow of nitrogen plus small quantities of oxygen through a particular furnace will depend on the amount of binder to be decomposed per unit time, with the provision that the oxygen content in a furnace operating at about atmospheric pressure does not exceed 0.01 percent by volume, which is $1 \times 10^{-4}$ atmospheres partial pressure.

In tests of methods of application of conductive inks according to the invention, it has been observed that oxygen contents in the peak temperature firing zone of the furnace over about 0.1 percent give black sintered inks and very poor conductivities. The black color apparently comes from CuO. Although some minor copper oxide formation can be expected on the powder particle surfaces, oxidation to the divalent cupric state appears to greatly lessen conductivity. Progressing from 0.01 to 0.1 percent oxygen content by volume in the peak firing zone, the coatings progressively change from bright metallic colors to reddish brown the color of $Cu_2O$ then to maroon, with progressive loss in conductivity. Therefore, 0.1 percent or $10^{116.3}$ atmospheres of oxygen is the upper limit for the invention, and it is preferred to keep the oxygen content below 0.01 or $10^{-4}$ atmospheres.

Another aspect of the present invention also involves additionally improving upon the basic ink formulation by incorporating a reducing agent within the mix. Brighter and more conductive copper conductors, for example, result at a given temperature and oxygen content when a reducing agent is originally present in the ink. Hydrazine hydrate, $H_2NNH_2 \cdot H_2O$, is the preferred additive, although other compounds which decompose upon heating to give off either hydrogen or carbon monoxide would be suitable. Urea, and various hydrides, and oxalates can be used as the reducing agents.

Since hydrazine is nonmiscible with the butyl carbitol acetate, a coupler such as "cellosolve solvent" sold by Union Carbide Corporation can be used to aid in the incorporation of hydrazine into the ink. This coupler also improves the flowability and printability properties of the ink. As an example of a typical preferred ink composition, the following can be used:

| | |
|---|---|
| 616 g. | Copper Metal Powder, VM-120-90-1, sold by Universal Minerals and Metals Inc., presifted through 400 mesh after firing at 450°–500° C. in a hydrogen atmosphere, |
| 27.2 g. | Ferro Corp. XT-1021 Glass Frit presifted through 400 mesh, |
| 430 g. | Binder—composed of 25% by weight of low-viscosity grade ethyl hydroxyethyl cellulose sold by Hercules, Inc., dissolved in 75% by weight butyl carbitol acetate, |
| 0.375 g. | Hydrazine premixed with |
| 6.09 g. | Cellosolve solvent sold by Union Carbide. |

The ink is then applied to an alumina substrate by silk-screening techniques and the imprint dried at 80° C. for 5 to 10 minutes.

Firing may be carried out in a continuous kiln, the work being carried through the kiln on a metal belt. Nitrogen is introduced into the furnace at about atmospheric pressure at a sufficient rate to maintain the $O_2$ content below 0.01 percent by volume. The oxygen content of the nitrogen gas used should be considered. The furnace ends are sealed, except for slots for the belt, to allow the achievement of this controlled atmosphere. A desirable oxygen content level is about 0.007 percent by volume.

A satisfactory peak firing temperature would be 820°–850° C. for this particular ink with the belt speed controlled to allow approximately 15 minutes above 600° C.

The furnace chamber must be long enough to allow the substrates to cool to a reasonable temperature so that oxidation will now proceed at an appreciable rate when the substrates exit from the furnace into air. A substrate exit temperature of 100°–150° C. is satisfactory.

The ink described above, when properly fired, will yield copper conductors with a conductivity of 20 to 40 milliohms per square per mil. The measure of resistance in ohms per square per unit thickness is well known in the art. For a coating of a particular thickness, such as measured in mils, a square will have the same resistance whatever the length of each side of the square, when the resistance is measured between perfect conductors attached across opposite sides of the square.

Conductivity measurements made on coatings produced using hydrazine hydrate as a reducing agent and firing at different oxygen contents in nitrogen at about atmospheric pressure are presented in Table I below.

TABLE I

| Sample | Conductivity of Coatings | |
|---|---|---|
| | Oxygen Content (%) | Resistivity (ohms/sq.) |
| 1 | 0.002 | 0.011 |
| 2 | 0.006 | 0.015 |
| 3 | 0.0065 | 0.017 |
| 4 | 0.007 | 0.02 to 0.035 |
| 5 | 0.01 | 0.5 to 0.7 |
| 6 | 0.13 | 3.3 |
| 7 | 0.25 | (megohms) |

Substantial improvements in producing inexpensive conductive inks have been described above and are defined in the following claims.

What we claim as new and desire to secure by Letters Patent of the United States is:

1. The method of forming a conductive metal layer on a refractory substrate which comprises the following steps:
    A. applying to said refractory substrate a mixture of from 5 to 40 parts by weight of metallic powder selected from the group consisting of copper, nickel, cobalt, and alloys based on one or more of them, and 1 part by weight of a reduction-resistant glass frit, said mixture being suspended in a fugitive organic suspending medium,
    B. firing said substrate in an otherwise inert atmosphere containing from a small amount effective to burn away said suspending medium up to about 0.1 percent by volume oxygen until said glass frit is at least partially sintered and said suspending medium is burned away leaving substantially no residue, and
    C. maintaining the same firing conditions until the glass frit bonds to the substrate without oxidizing the metallic powder to a nonconductive oxide.

2. The method of claim 1 wherein the selected metallic powder is copper and a mixture by weight of from 10 to 40 parts metallic powder to 1 part glass frit is used with an oxygen content no more than 0.01 percent by volume.

3. The method of claim 1 wherein the balance of the atmosphere in addition to said quantity of oxygen is essentially all nitrogen.

4. The method of claim 1 wherein the selected metallic powder is copper and said mixture also comprises a reducing agent which will aid in preventing oxidation of the copper powder.

5. The method of claim 2 in which said glass frit content of said ink amounts to less than about 6 percent by weight of the amount of copper powder.

6. The method of claim 5 in which said glass has approximately the following composition in percent by weight:

| Composition | Percent |
|---|---|
| PbO | 66.4 |
| SiO$_2$ | 17.6 |
| B$_2$O$_3$ | 9.9 |
| CdO | 6.1 |

7. The method of claim 7 wherein the firing is performed so as to reach a peak temperature in the range of about 820°–850 °C.

* * * * *